United States Patent
Tseng et al.

(10) Patent No.: US 6,519,141 B2
(45) Date of Patent: *Feb. 11, 2003

(54) HANDHELD COMPUTER COVER WITH DEFORMABLE EXTERIOR

(75) Inventors: Grace Tseng, Palo Alto, CA (US); Maaike Evers, San Francisco, CA (US); Victor Heldt, Sunnyvale, CA (US); David Christopher, San Francisco, CA (US); Brent Eikanas, San Jose, CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/956,621

(22) Filed: Sep. 19, 2001

(65) Prior Publication Data

US 2002/0027768 A1 Mar. 7, 2002

Related U.S. Application Data

(63) Continuation-in-part of application No. 09/570,362, filed on May 12, 2000, now Pat. No. 6,381,126.

(51) Int. Cl.⁷ .................................................. G06F 1/16
(52) U.S. Cl. ........................ 361/683; 361/759; 312/216; 70/57
(58) Field of Search .................................. 361/686, 683, 361/680–681, 724–727, 740, 759; 345/169; 439/928; 360/137, 97.01, 98.01; 312/216

(56) References Cited

U.S. PATENT DOCUMENTS

| 6,052,279 A | * | 4/2000 | Friend et al. ................ 361/686 |
| 6,104,617 A | * | 8/2000 | Schremmer .................. 361/737 |
| 6,115,248 A | * | 9/2000 | Canova et al. ............... 361/686 |

* cited by examiner

*Primary Examiner*—Darren Schuberg
*Assistant Examiner*—Hung Van Duong
(74) *Attorney, Agent, or Firm*—Van Mahamedi; Hickman Palermo Truong & Becker LLP (57) ABSTRACT

A handheld computer is provided that includes a first module combined with one or more modules. The first module includes a housing having one or more coupling surfaces, with each coupling surface including a coupling mechanism. A second module is coupleable to the first module. The second module includes a third coupling surface having a second coupling mechanism for mating with the first coupling mechanism. The third coupling surface is positioned on the second module so as to abut at least partially against the second coupling surface when the first coupling mechanism is mated with the second coupling mechanism.

21 Claims, 6 Drawing Sheets

HANDHELD COMPUTER COVER WITH DEFORMABLE EXTERIOR

RELATED APPLICATION

This application is a continuation-in part of U.S. patent application Ser. No. 09/570,362; filed on May 12, 2000 now U.S. Pat No. 6,381,126, issued on Apr. 30, 2002. The aforementioned application is hereby incorporated by reference.

FIELD OF THE INVENTION

The present invention relates to covers for handheld computers. In particular, the present invention relates to a handheld computer cover formed from deformable material.

BACKGROUND OF THE INVENTION

Handheld computers, sometimes referred to as personal digital assistants (PDAs), are mobile information management devices. While these devices come in various shapes and designs, they generally are small and made to be carried on a user. The user often operates the handheld computer several times a day for short durations. A typical use for the handheld computer is to retrieve or enter one data item.

Due to their mobile nature, handheld computers are susceptible to damage. To avoid damage, some handheld computers incorporate covers, which can protect the display and/or other components of the handheld computers. Other handheld computers use attachable covers and encasements. In general, the covers are intended to protect one panel of a handheld computer. Encasements protect two panels at the same time.

Figure 7:
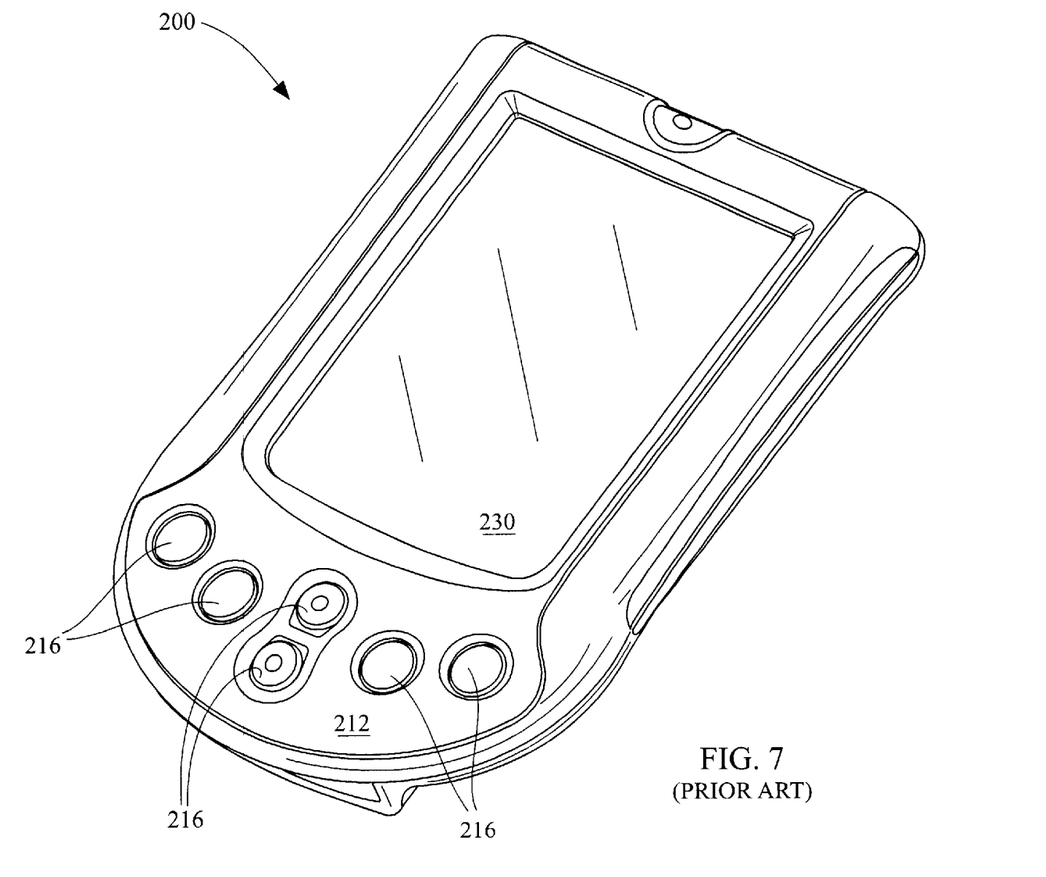
FIG. 7 is an isometric view of a handheld computer, suitable for an embodiment of the invention.

FIG. 7 illustrates an exemplary handheld computer 200. The handheld computer 200 may correspond to a PALM m100 organizer (manufactured by PALM INC). Other types of handheld computers include devices that operate the MICROSOFT POCKET PC operating system, such as the HP JORNADA(manufactured by HEWLETT-PACKARD). Still further, other types of handheld computers include intelligent cell phones.

With reference to FIG. 7, handheld computer 200 includes a front panel 212. A display 230 is provided on the front panel 212. A plurality of application buttons 216 are provided on front panel 212, just beneath the display 230.

Covers for PDA's such as shown above are typically formed from rigid materials, such as plastic, metal or titanium. Other PDA's may use covers or encasements formed from leather or vinyl.

SUMMARY OF THE INVENTION

According to an embodiment of the invention, a cover is formed from a rigid frame combined with a deformable layer. The deformable layer is shaped to cushion regions of the handheld computer when the cover is employed. The rigid frame gives the cover some strength and support.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Embodiments of the invention describe a cover for a handheld computer. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

An embodiment of the invention provides a cover for use with a handheld computer. The cover is at least partially formed from a deformable material such as an elastomer. The cover includes features to enable it to attach to a handheld computer so as to protect components of the handheld computer.

In an embodiment, a cover for a handheld computer includes a rigid frame, a coupling mechanism, and a deformable layer. The rigid frame has a first dimension measured along a lengthwise axis of the handheld computer. The deformable layer has a second dimension measured along the lengthwise axis of the cover. The second dimension is larger than the first dimension. The coupling mechanism is configured to detachably connect the cover to the handheld computer.

As used herein, a dimension is a length, or width of an object measured along a particular axis. The first dimension may correspond to a length of the cover where the rigid member extends, and the second dimension may correspond to a length of the cover having the deformable layer.

The cover is detachably connected to the handheld computer because a user can manipulate its coupling mechanism to connect the cover to the handheld computer, and to detach the cover from the handheld computer.

Among some advantages provided by embodiments of the invention, a majority of the cover's exterior material is padded by the deformable layer. In particular, a region of the cover is padded with no interior rigidity. Another region of the cover may also include a thicker cross-section comprising additional material for the deformable layer.

The cover protects a front panel of the handheld computer, but the deformable layer avoids unwanted pressure from damaging or activating the handheld computer. In particular, portions of the cover with added cushion characteristics are positioned over areas of the handheld computer where a display and buttons are provided. Portions of the cover having added cushion characteristics include the region of the cover having no internal rigidity, and regions of the cover having added thickness. The padding provided by the deformable layer in these portions dampens forceful contact that can damage the display. One or more of these regions may also dampen unwanted contact that may actuate one of the buttons on the handheld computer.

B. Detailed Description of Cover and Handheld Computer

Figure 1:
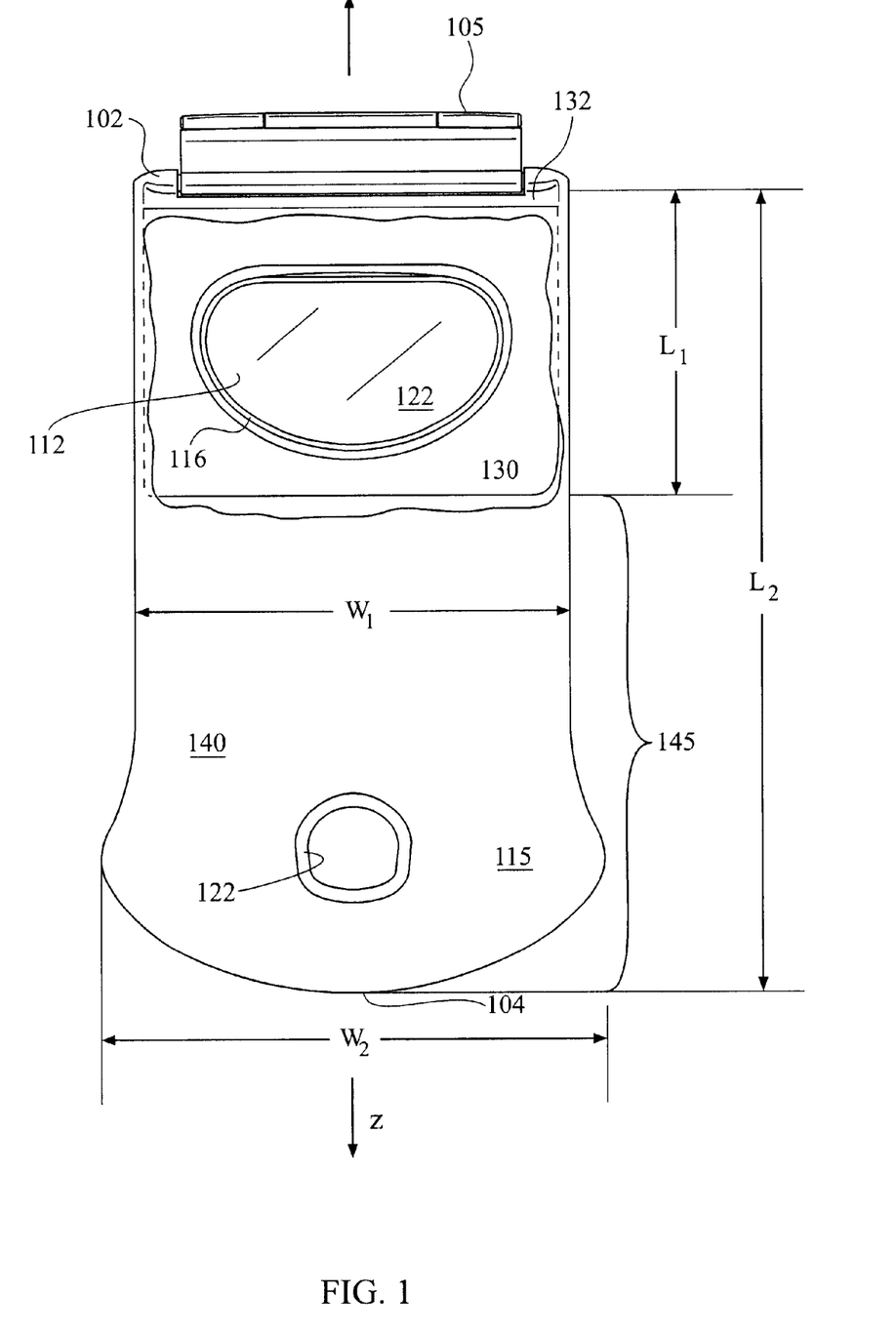
FIG. 1 is a front view of a cover for a handheld computer.

FIG. 1 is a front view of a cover 100 for a handheld computer 200. The cover 100 includes a top edge 102 and a bottom edge 104. An attachment panel 105 extends from the top edge 102. The attachment panel 105 includes a coupling mechanism to enable the cover to detachably connect to handheld computer 200. The front view shows a front surface 115 of cover 100. The front surface 115 is intended to form an exterior of cover 100 when the cover is attached to handheld computer 200 and used to protect the handheld computer's front panel 212.

The cover 100 extends along a lengthwise axis Z. A display opening 112 is provided on cover 100. FIG. 1 shows an interior of cover 100 having a rigid frame 130. The cover 100 may be formed from a combination of rigid frame 130 overlaid by a deformable layer 140. In particular, deformable layer 140 may envelope all or a majority of rigid frame 130. Therefore, rigid frame 130 may be primarily interior on cover 100, while deformable layer 140 forms a majority of the cover's exterior. The term majority means more than 50%.

In an embodiment, rigid frame 130 extends a first length L1 along the lengthwise axis Z. The deformable layer 140 extends a second length L2 along the lengthwise axis. The length L2 is greater than L1. In one embodiment, L2 corresponds to more than 90% of the overall length of cover 100, measured from attachment panel 105 to bottom edge 104. The deformable layer 140 extends into a region 145 that does not contain rigid frame 130. A length of region 145 is L2–L1. Therefore, a thickness of region 145 contains only deformable material, with no internal rigidity, so as to provide added cushion characteristics to cover 100. The region 145 may correspond to where cover 100 protects the display, and/or overlays the buttons 216 (FIG. 7) of handheld computer 200.

In an embodiment, the length of region 145 (L2–L1) corresponds to a majority of the cover's overall length (L2). Thus, L2 may be at least 50% greater than L1. In one application, L2 may be more than 100% greater than L1.

The rigid frame 130 maybe assembled to attachment panel 105. The rigid frame 130 is unitarily constructed. The term unitarily formed means that the component is formed during a single manufacturing process. For example, rigid member 130 may be unitarily formed as a result of a molding process that creates it. The rigid frame 130 may be formed from rigid plastic in the molding process. Alternatively, materials such as metals may be used to form rigid frame 130.

Furthermore, rigid frame 130 and deformable layer 140 may each be unitarily combined. That is, deformable layer 140 is combined with rigid member 130 using a manufacturing process that causes the two components to be formed into one item. In particular, deformable layer 140 may be molded onto rigid frame 130 after the rigid frame is formed, so that deformable layer 140 envelopes rigid member 130, and is inseparable from the rigid member without damage. To this end, a suitable material for deformable layer 140 is an elastomer.

Alternatively, deformable layer 140 may be attached to rigid member 130 using glue or traditional coupling mechanisms, such as fasteners. Specific examples of materials that could alternatively be used for deformable layer 140 include deformable plastic, rubber, thick leather or fabric, vinyl, a material with a sponge or foam core, or other materials and material combinations that provide a cushion characteristic to cover 100.

The rigid frame 130 may be partially exposed in some regions of front surface 115. A display opening 112 may be formed on a segment of cover 100. The display opening 112 may be formed by rigid frame 130. A perimeter 116 of display opening 112 exposes rigid frame 130. In addition, a strip 132 or other region adjacent to attachment surface 105 may be exposed.

A non-opaque material 122 may be provided in the opening 112. The non-opaque material 122 may correspond to glass or translucent plastic. In one embodiment, the non-opaque material 122 may be press fitted into the opening 112.

A button opening 122 is provided on the cover towards bottom edge 104. The button opening 122 is positioned to enable one of the buttons 216 (see FIG. 7) of handheld computer 200 to be accessible when the cover 100 is resting on front panel 212 of the handheld computer. One of the buttons 216 on front panel 212 may be exposed to enable a user to actuate the handheld computer.

A width of cover 100 is variable over the length L2. In one embodiment, the width of cover 100 increases near where button opening 122 is located. The width of cover 100 may correspond to W1 where cover 100 is to overlay the display 230 (FIG. 7). The width of cover 100 may correspond to W2 where cover 100 is to overlay the buttons 216 (FIG. 7) of handheld computer 200.

Figures 2, 3:
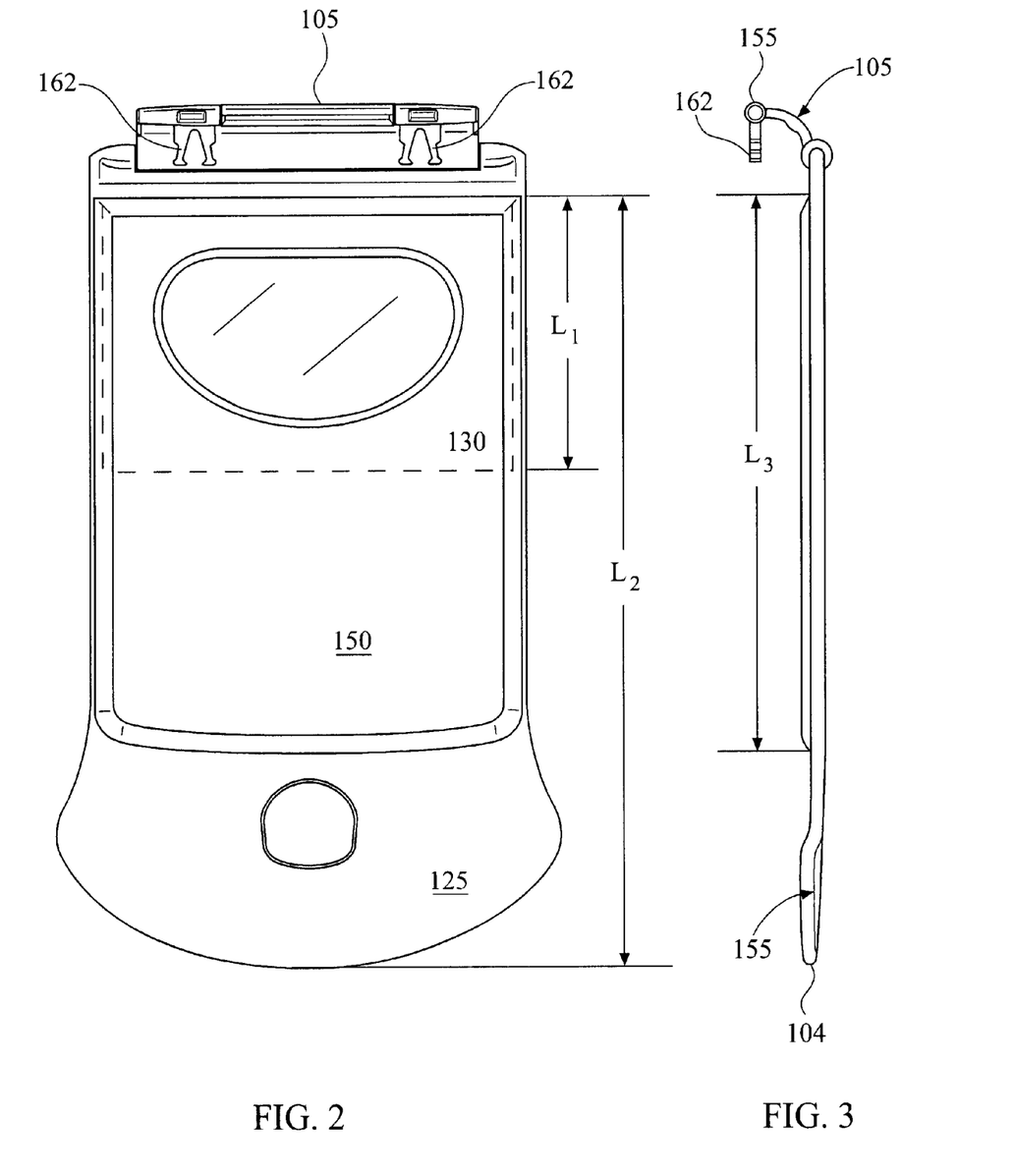
FIG. 2 is a rear view of the cover.
FIG. 3 is a side view of the cover.

FIG. 2 is a rear view of cover 100. A back surface 125 of cover 100 is configured to rest adjacent to the front panel 212 of cover 100 when the cover is used to protect the front panel 212. The back surface includes a padded region 150. The padded region 150 may be provided on a portion of cover 100 corresponding to portions of L1 and L2. Thus, the padded region 150 is a segment that extends over portions of rigid frame 130 (shown in phantom). In one embodiment, padded region 150 extends a majority of L2.

The padded region 150 may be formed from an extra thickness of material used for deformable layer 140. For example, padded region 150 may correspond to where deformable layer 140 has extra elastomer material. Alternatively, padded region 150 may correspond to where additional material, such as foam core, is provided to protrude from back surface 125.

By enabling the padded region 150 to extend from back surface 125, features of handheld computer 200 are better protected against unwanted contact. In particular, padded region 150 maybe dimensioned to fit into a recess of the handheld computer's front panel 212 where the display 230 (FIG. 7) resides. In this way, additional protection can be provided to the display 230 (FIG. 7), which is vulnerable to sharp contact.

FIG. 2 also shows a coupling mechanism for attaching cover 100 to handheld computer 200, under an embodiment of the invention. The coupling mechanism may correspond to a pair of clips 162, 162, which insert into corresponding openings of handheld computer 200. An example of a coupling mechanism for use with an embodiment of the invention is described in detail by U.S. patent application Ser. No. 09/570,362, hereby incorporated by reference. The coupling mechanism enables cover 100 to be attached and detached to handheld computer 200 by a user. The cover can be moved about a top of handheld computer 200. One position of cover 100 is adjacent to the front panel 212 of handheld computer 200, with front surface 115 forming the exterior of cover 100. Another position of cover 100 is adjacent to a back panel 222 (FIG. 5) of handheld computer 200, with rear surface 125 forming the exterior of cover 100.

FIG. 3 is a side view of cover 100. As shown, an overall length of padded region 150 corresponds to the length L3, measured along the lengthwise axis Z. The length L3 may encompass all or portions of L1.

The deformable layer 140 may also include a bent segment 155 near the bottom 104. The bent segment 155 may be used to match a contour on the surface of the handheld computer's front panel 212.

In an embodiment, a coupling mechanism for cover 100 includes attachment panel 105, a bridge 155, and clips 162. The bridge 155 connects clips 162 to attachment panel 105. The bridge 155 is pivotally connected to attachment panel 105. The attachment panel 105 is contoured to reach over a top of handheld computer 200. In particular, attachment panel 105 may be arced to reach over the top of handheld computer 200. The clips 162 extend downward from attachment panel 105. The shape of attachment panel 105 facilitates motion of cover 100 between positions against the front panel 212 and back panel 222 of handheld computer 200. The clips 162 can be pivoted into an engaged position using bridge 155.

Figure 4:
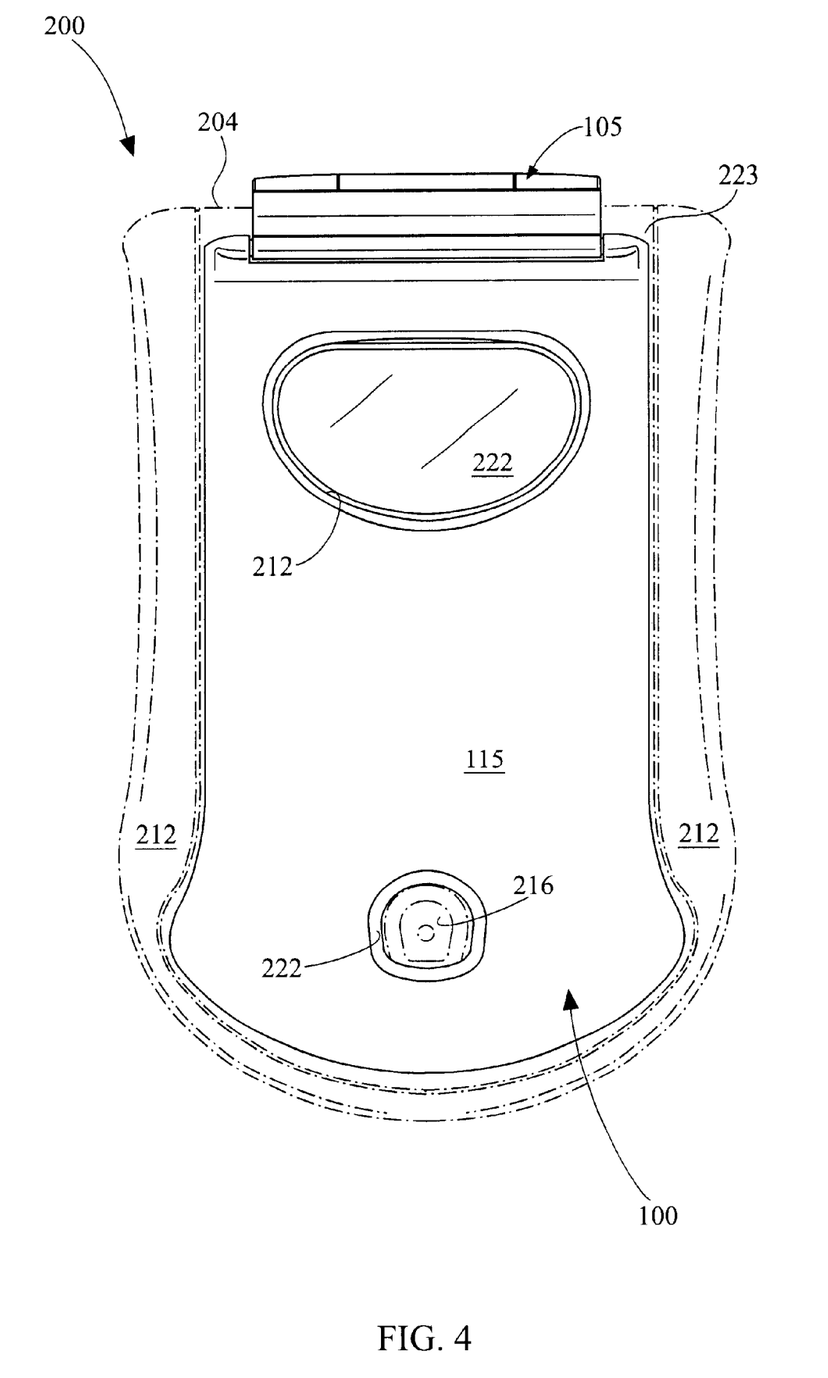
FIG. 4 is a front view of a cover attached to a handheld computer, with the handheld computer shown in phantom.

FIG. 4 is a front view of a cover attached to a handheld computer, with the handheld computer shown in phantom. The front surface 115 of cover 100 forms an exterior for the combination of cover 100 and handheld computer 200. The cover 100 is configured so that display opening 112 and non-opaque material 122 are positioned over the display 230 (FIG. 7) of handheld computer 200. One or more of the buttons 216 of handheld computer 200 may extend from button opening 122.

The cover 100 may be shaped to overlay all of the handheld computer's display 230 (FIG. 7), and all of the handheld computer's buttons 216 (FIG. 7) except for one or more exposed buttons. The buttons 216 exposed by opening 116 may be configured to switch handheld computer 200 into an active state.

The attachment panel 105 connects into a top housing segment 204 of handheld computer 200. The top housing segment 204 may include a midframe, contained between exterior shells of handheld computer 200. Openings 264 (FIG. 6) to receive the coupling mechanism may be provided on the top housing segment 204.

A decorative groove 223 may be provided on front panel 212 of handheld computer 200. The groove 223 may trace a geometry that at least partially surrounds the display 230 (FIG. 7) and buttons 216 (FIG. 7) of handheld computer 200. The general shape of cover 100 may match the geometry of the groove 223. The cover 100 may be dimensioned so that groove 223 is visible as an outline of the cover's perimeter, when the cover is positioned adjacent front panel 212 of handheld computer 200.

Figure 5:
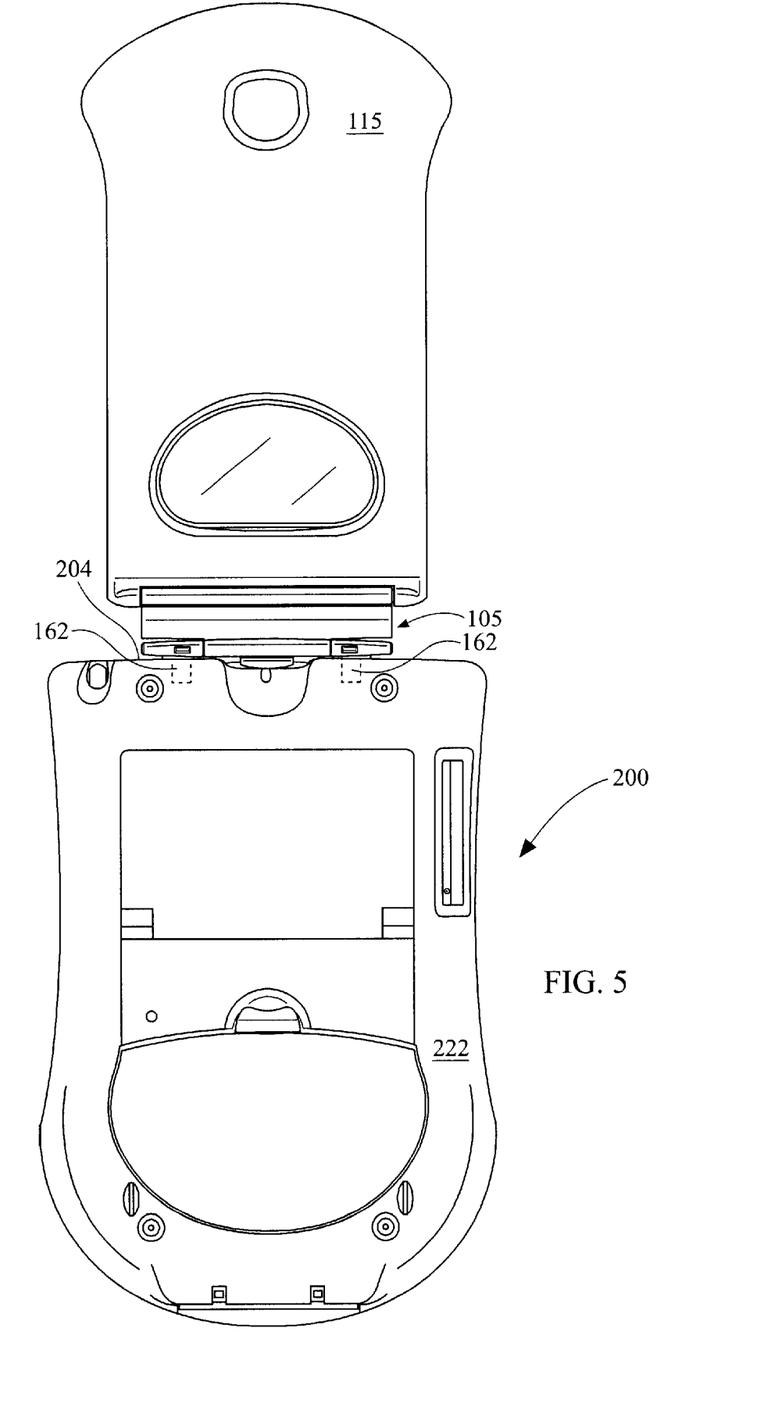
FIG. 5 is a rear view of the cover in an extended position about the handheld computer, with the handheld computer shown in phantom.

FIG. 5 is a rear view of cover 100 in an extended position about the handheld computer 200. The cover 100 is shown in an intermediate position, between resting against front panel 212 (FIG. 4) and back panel 222 (FIG. 5) of handheld computer 200. From the rear, front surface 115 of cover 100 is moved over the top housing surface 204 of handheld computer 200 so as to be interior on cover 100 when adjacent to back panel 222.

The attachment panel 105 is contoured about top housing surface 204. The clips 162 can secure into openings 264 (FIG. 6) of handheld computer 200 (FIG. 4). The bridge 155 enables cover 100 to pivot about top housing segment 204. As such, cover 100 can be moved from the front panel 212 to the back panel 222. When in the extended position, clips 162 are extended vertically into openings at the top housing segment 204 of handheld computer 200.

Figure 6:
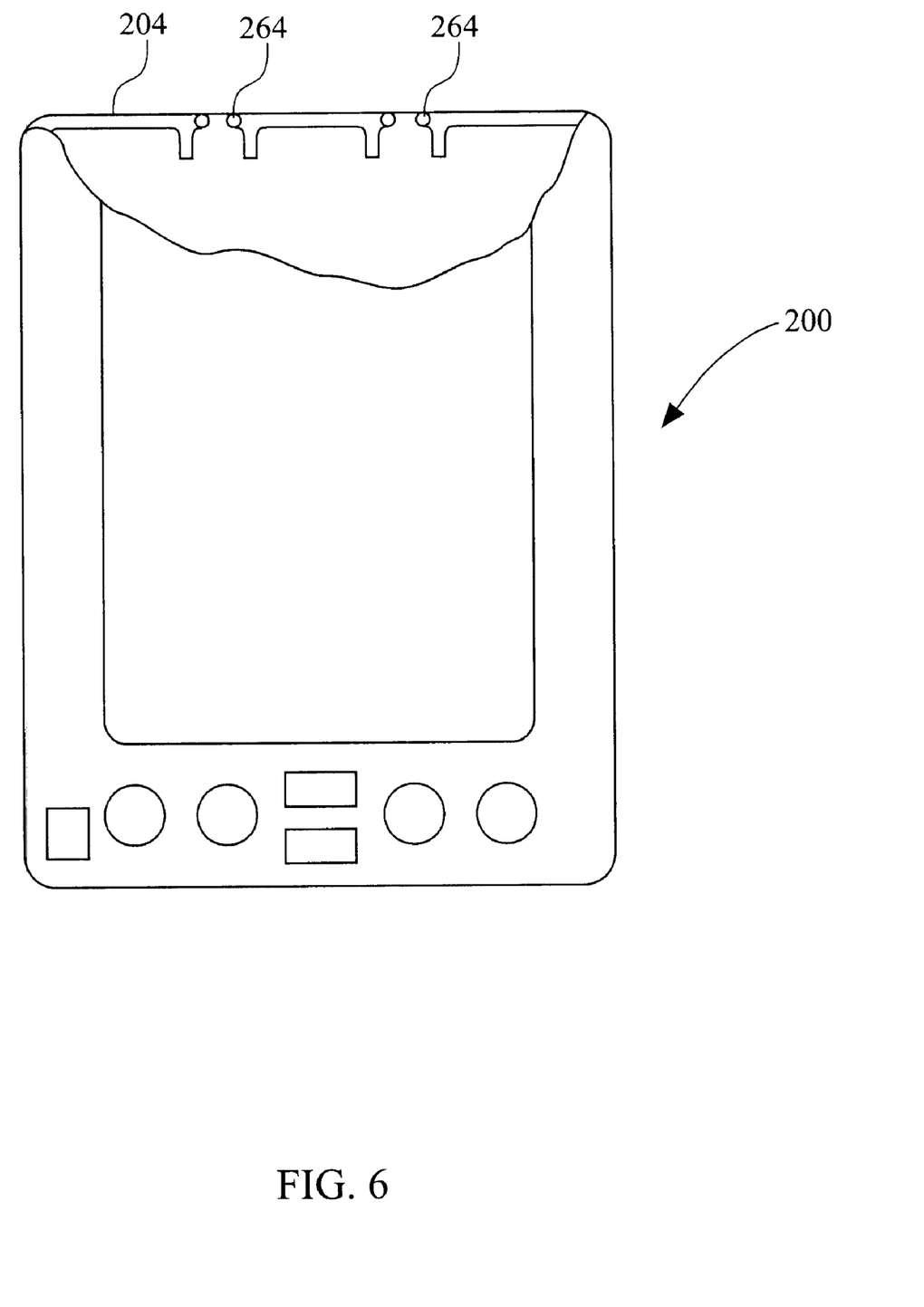
FIG. 6 is a front view of a handheld computer configured for use with an attachable cover, under an embodiment of the invention.

FIG. 6 is a simplified front view of a handheld computer that is configured to attach to a cover, under an embodiment of the invention. The handheld computer 200 includes openings 264 in the top housing surface 204 to receive clips 162. The openings 264 may be formed into a midframe of the handheld computer's housing.

C. Alternative Embodiments

While embodiments of the invention describe cover 100 pivotally connected to the top edge of handheld computer 200, other embodiments may provide for other connection configurations. In particular, cover 100 may be connectable to one of the sides of the handheld computer 200. Alternatively, the cover 100 may be connectable to a bottom of the handheld computer 200.

The cover may also be permanently attached to the handheld computer, rather than detachably connected. Thus, one embodiment contemplates that the cover 100 is fixed to the handheld computer so as to not be detachable.

D. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A cover for a handheld computer, the cover comprising:
    a rigid frame having a first dimension, the first dimension being measured along a lengthwise axis of the cover;
    a coupling mechanism to detachably connect the cover to the handheld computer, the coupling mechanism extending from the rigid frame; and
    a deformable layer extended over a majority of the rigid frame and having a second dimension, the second dimension being measured along the lengthwise axis, and the second dimension being greater than the first dimension.

2. The cover of claim 1, wherein the second dimension of the deformable layer is at least 50% greater than the first dimension of the rigid frame.

3. The cover of claim 1, wherein the second dimension of the deformable layer is at least 100% greater than the first dimension of the rigid frame.

4. The cover of claim 1, wherein the rigid frame is formed from molded plastic, and wherein the deformable layer is formed from an elastomer material.

5. The cover of claim 1, wherein the cover includes a first side that is exterior to the handheld computer when the cover is attached to the handheld computer and positioned adjacent to a front panel of the handheld computer, and a second side that is interior to the handheld computer when the cover is attached to the handheld computer and positioned adjacent to the front panel of the handheld computer, and wherein portions of the first side and the second side which extend over a majority of the handheld computer are formed from the deformable material.

6. The cover of claim 1, wherein a thickness of a first region of the cover is greater than a thickness of a second region of the cover.

7. The cover of claim 1, wherein the cover includes a segment formed from non-opaque material.

8. The cover of claim 1, wherein a width of a bottom portion of the cover is greater than a width of the top portion of the cover, so that when the cover is attached to the handheld computer and positioned adjacent to a front panel of the handheld computer, the bottom portion covers a plurality of buttons on the front panel, and the top portion covers a display of the handheld computer.

9. The cover of claim 4, wherein the elastomer material is formed over the rigid frame in a molding process.

10. The cover of claim 6, wherein the first region overlays a display of the handheld computer when the cover is attached to the handheld computer and positioned adjacent to a front panel of the handheld computer.

11. The cover of claim 7, where the non-opaque material is retained in position by the rigid frame.

12. The cover of claim 11, wherein the non-opaque material is press-fitted into an opening formed by the rigid frame.

13. The cover of claim 12, wherein the non-opaque material and opening are positioned to over a display of the handheld computer when the cover is attached to the handheld computer and positioned adjacent to a front panel of the handheld computer.

14. The cover of claim 12, wherein an edge of the opening formed from the rigid frame is exposed on the cover.

15. A handheld computer assembly comprising:
  a handheld computer comprising:
    a front panel;
    a display provided on the front panel; and
    a plurality of buttons provided on the front panel;
  a cover comprising:
    a rigid frame having a first dimension, the first dimension being measured along a lengthwise axis of the cover; and
    a deformable layer extended over a majority of the rigid frame and having a second dimension, the second dimension being measured along the lengthwise axis, and the second dimension being greater than the first dimension; and
  a coupling mechanism to detachably connect the cover to the handheld computer.

16. The handheld computer assembly of claim 15, wherein the cover is dimensioned to overlay only a portion of the front panel, the portion of the front panel including the display and the plurality of buttons, and wherein the cover includes a first region having a first width for covering the portion of the front panel that provides the display, and to have a second region having a second width for covering the portion of the front panel that provides the plurality of buttons, and wherein a periphery of the cover is contoured.

17. A handheld computer comprising:
  a front panel;
  a display provided on the front panel; and
  a plurality of buttons provided on the front panel;
  a cover comprising:
    a rigid frame having a first dimension, the first dimension being measured along a lengthwise axis of the cover; and
    a deformable layer extended over a majority of the rigid frame and having a second dimension, the second dimension being measured along the lengthwise axis, and the second dimension being greater than the first dimension; and
  a coupling mechanism to detachably connect the cover to the handheld computer;
  wherein the coupling mechanism comprises one or more clips that extend from an edge of the cover.

18. The handheld computer assembly of claim 17, wherein the handheld computer includes a housing having one or more openings that are aligned to receive and couple to the one or more clips of the attachment mechanism.

19. A handheld computer comprising:
  a front panel;
  a display provided on the front panel; and
  a plurality of buttons provided on the front panel;
  a cover comprising:
    a rigid frame having a first dimension, the first dimension being measured along a lengthwise axis of the cover; and
    a deformable layer extended over a majority of the rigid frame and having a second dimension, the second dimension being measured along the lengthwise axis, and the second dimension being greater than the first dimension; and
  a coupling mechanism to detachably connect the cover to the handheld computer;
  wherein the cover includes a first region having a thickness that is greater than a second region, and wherein the first region is positioned so as to overlay the display when the cover is attached to the handheld computer and positioned to be adjacent to the front panel.

20. The handheld computer assembly of claim 19, wherein the cover is moveable between a first position and a second position about the handheld computer when the cover is attached to the handheld computer, the first position corresponding to the cover being adjacent to the front panel of the handheld computer, the second position corresponding to the cover being adjacent to a back panel of the handheld computer.

21. A cover for a handheld computer, the cover comprising:
  a rigid frame having a first dimension measured along a lengthwise axis of the cover; and
  a deformable layer extended over a majority of the rigid frame and having a second dimension, the second dimension being measured along the lengthwise axis, and the second dimension being greater than the first dimension.

* * * * *